Patented Oct. 26, 1954

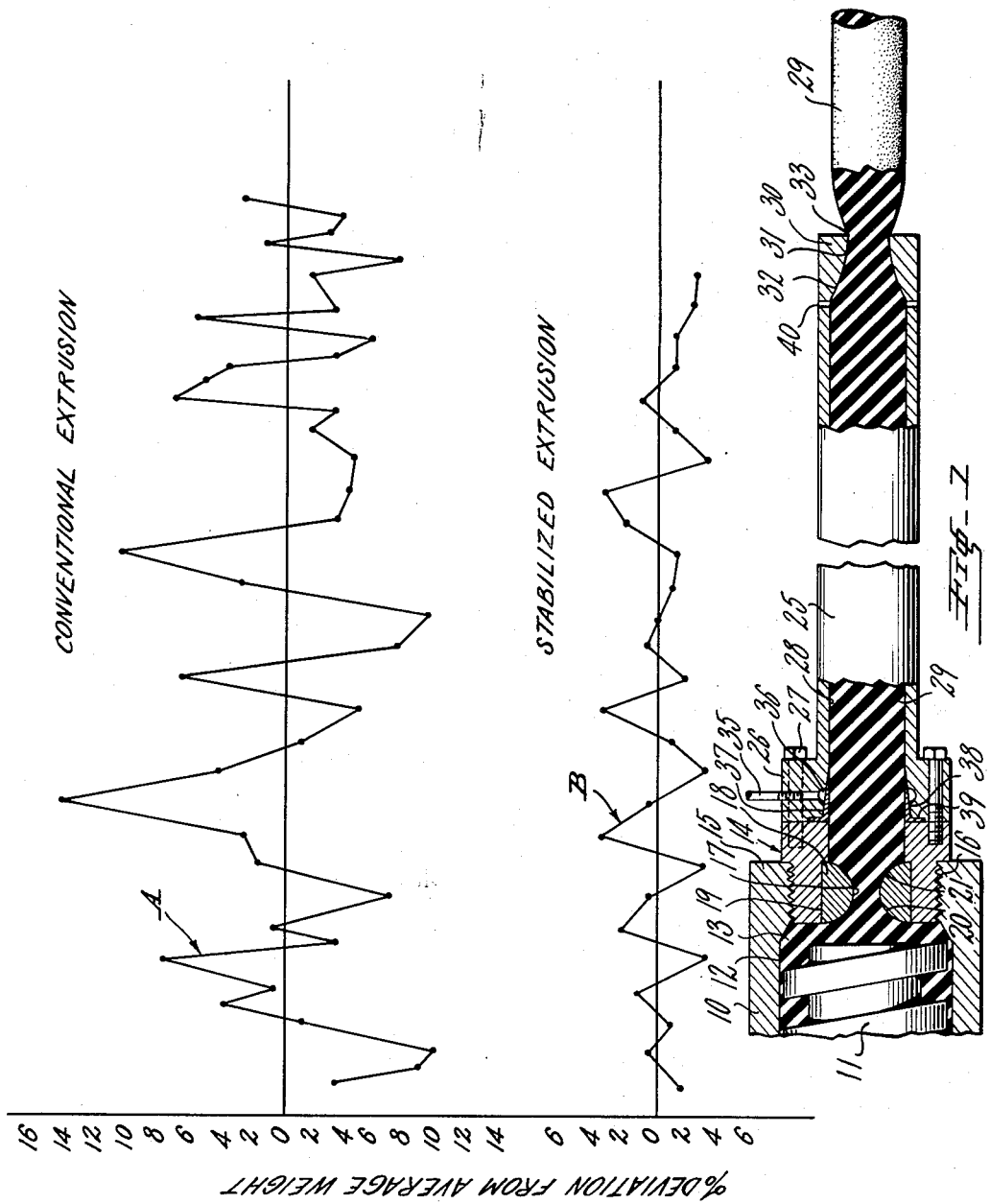

2,692,406

UNITED STATES PATENT OFFICE 2,692,406

METHOD AND APPARATUS FOR EXTRUSION OF PLASTICS HAVING ELASTIC MEMORY

Thomas J. Rhodes, Clifton, and James J. Neville, Maywood, N. J., assignors to United States Rubber Company, New York, N. Y., a corporation of New Jersey Application May 25, 1950, Serial No. 164,282

6 Claims. (Cl. 18—12)

This invention relates to a method and apparatus for extruding plastic materials having considerable elastic memory, such as raw rubber products, in shaped forms having more constant size than has heretofore been obtainable. More particularly, it relates to an improved extrusion method involving the steps of advancing the plastic material under pressure through a constricted orifice, and then forcing the plastic to assume a cross-sectional size greater than the size to which the plastic would ordinarily swell elastically upon emerging from such constricted orifice, and confining the advancing material in such size until its tendency to change size upon release from confinement has been substantially reduced.

When plastic materials having a relatively great elastic memory, such as rubbery materials, are extruded from the usual extrusion apparatus in the conventional manner, it is observed that the extruded product, upon emerging from the extrusion die, swells radially to a greater cross-sectional size than the size of the die orifice. This radial swelling is accompanied by longitudinal shrinkage of the product along the axis of extrusion. This swelling and shrinkage upon emerging from a die orifice of given size is dependent on such variables as the viscosity of the stock fed to the extruder, the temperature of the extruder, and the pressure on the stock. Therefore the swelling and shrinkage, in practice, are not constant values but vary over a considerable range from time to time during the extrusion operation due to the normal unavoidable variations in the character of the plastic stock and the conditions of extrusion. For this reason, it has heretofore been extremely difficult to obtain certain shaped plastic products, notably vulcanizable rubber products, of unvarying cross-sectional dimensions. For example, when extruding a conventional rubber golf ball center stock to obtain "preforms" for molding, that is, shaped pieces of definite volume or weight, it is observed that the weight of equal lengths of the extruded product may vary by an average value of greater than plus or minus 5%. This means that some of the equal lengths may contain insufficient material to fill the golf ball center molds properly, so that a defective center is produced, and others of the equal lengths may contain too much material, so that excessive "flash" overflows from the mold and is wasted.

The principal object of the present invention is to provide an improved extrusion method and apparatus in which the foregoing variations in the size of the extruded product are minimized, with consequent savings in materials and improvement in quality of the product.

Heretofore, attempts have been made to stabilize the dimensions of extruded plastic products by cooling the product very slowly while maintaining it in the desired shape within a die of extremely great length; the die being continuously lubricated to permit passage of the plastic therethrough. However, the effectiveness of such a method on products having extremely great elastic memory, such as rubbery products, is limited, the process is relatively slow, and the apparatus required in this prior process is expensive to construct as well as difficult to operate by reason of the extreme length of the cooling die.

We have now discovered that the tendency of extruded elasto-plastic products having a relatively great elastic memory (sometimes called elastoplastics) to vary in size can be reduced to a remarkable extent, by forcing the extruded plastic material, after its emergence from the die orifice, to assume a size greater than the size to which it would normally swell, and confining the extruded material while maintained at such size for a relatively short time. Upon the release of the extruded plastic product from the larger confining passage, its subsequent change in size is very small. The die passage accordingly is of such design that its smallest cross-section is much smaller than the cross-section of the extruded article to be produced.

Since it is not essential to the process that the extruded product be cooled to any great extent, the dies employed may be relatively short, and the extrusion may be carried out rapidly.

An embodiment of the invention is disclosed in the accompanying drawings, wherein Fig. 1 is a side elevation, largely in section, of an extrusion apparatus constructed according to the present invention and adapted to carry out the method of the invention; and Fig. 2 is a graphical representation of the variation in weight of a raw rubber product obtained by conventional extrusion, compared to the variation in weight obtained with the present invention.

Referring to Fig. 1, the apparatus shown comprises a conventional extruder 10 having a rotating feeding screw 11 disposed within a coaxial cylindrical barrel or extrusion chamber 12 for advancing plastic stock, such as vulcanizable rubber stock 13, through the apparatus under pressure. It will be understood that the screw 11 is rotated within the barrel 12 by a suitable driving means (not shown) in the conventional manner, and that the plastic stock 13 is fed into the extruder 10 through the usual hopper on the entrance end thereof (not shown).

A die assembly 14 is detachably connected to the delivery end 15 of the extruder 10, as by cooperating screw threads 16 on the outer diameter of the die assembly and the inner diameter of the end 15. The die assembly has a throat or central constricted die passage 17 of smaller diameter than that of the extrusion chamber 12. The die passage 17 is formed in an annular member 18 disposed within a recess 19 in the entrance to the die assembly 14. In order to enable smooth, streamlined flow of the stock 13, into and out of the die passage 17, the annular restricting member 18 is smoothly curved into and out of the orifice 17, as indicated at 20 and 21.

As is conventional practice, means (not shown) may be provided for heating the extruder 10 and the die assembly 14 to facilitate the extrusion.

In order to permit the swelling of the rubber stock 13 after it has passed from the die passage 17, to a size greater than the size to which the emerging stock would ordinarily swell, and in order to confine the stock maintained at such expanded size for the required period of time, an elongated confining tube 25 is attached to the delivery end of the die assembly 14. The tube 25 has an enlarged flange portion 26 at its entrance end, through which bolts 27 pass into the body of the die assembly 14 for detachably securing the tube to the die assembly.

The confining tube 25 has an elongated passageway 28 of the cross-sectional size and shape of the desired article, which in this case is a cylindrical rod 29 of vulcanizable rubber stock. The exit end of the tube 25 has a snubbing portion 30 having a constricted passageway 31 therein of smaller diameter than that of the confining passage 28. The purpose of the snubber 30 is to constrict the product 29 as it passes from the confining passageway 28, thus providing a resistance to flow so that the stock 13, upon entering the confining passageway from the relatively narrow die passageway 17, will be forced to completely fill the passageway 28. In this way there is formed the dense, uniform rod 29 which advances through the passageway 28 in close confining engagement with the walls thereof under the influence of the extrusion pressure exerted on the stock 13 by the rotating feeding screw 11. The entrance to the constricted passageway 31 has a smooth taper 32 in order that the shaped rod 29 passing therethrough will be temporarily constricted as at 33 without turbulent flow or disruption of the stock.

In order to permit the rod 29 to pass through the long tube 25 without exertion of prohibitively high extrusion pressure and without exerting disrupting strains on the rubber by frictional engagement with the walls of the elongated passageway 28, means are provided for introducing a thin continuous film of liquid lubricant between the surface of the advancing rod 29 and the walls of the passageway 28. Such lubricating means is located at the entrance end of the confining tube 25 and includes a lubricant inlet tube 35 passing through the flange 26 to an annular distributing passageway 36 located in the wall of a suitable recess 37 at the entrance of the tube 25. The recess 37 is so shaped as to accommodate a thin tapered annular lubricant applicator blade 38, which is brazed to and held in place by a retaining ring 39 located between the face of the die assembly 14 and the confining tube 25. A small amount of lubricant introduced at a constant rate from a suitable positive pumping system (not shown) through the delivery tube 35, passes out under the forward edge of the applicator blade 38 onto the surface of the passing rubber. The applicator blade 38 distributes the lubricant evenly and keeps the rubber stock from entering the lubricant distributing passageway 36.

It is necessary to provide means for the lubricant to escape before the rod 29 passes through the constricting passageway 31 at the end of the tube 25 in order that there will not be an accumulation of lubricant at this point, which would result in alteration of the shape of the rod 29. For this purpose, a series of small radial lubricant bleed holes 40 is provided in the wall of the tube 25, just before the snubber portion 30.

In operation, the rubber stock 13 is advanced continuously from the chamber 12 within the extruder 10 under the influence of the feeding screw 11, through the tapered passage formed by the curved surface 20 and into constricted die passage 17. Upon emerging from the die passage 17 the rubber stock flows smoothly outwardly along the curved surface 21 and completely fills the passageway 28 in the tube 25, because the constriction 31 at the exit end of the tube 25 permits the feeding screw 11 to develop sufficient pressure on the stock within the tube 25. In this way the rubber stock 13 is shaped into the form of the desired cylindrical rod 29 which is maintained in the desired size and shape throughout its traversal of the elongated confining passageway 28. A small quantity of liquid lubricant is continuously applied to the surface of the rod 29 to permit it to pass through the passageway 28 without strain, by means of the annular lubricant applicator blade 38 in association with the lubricant distributing passageway 36 and the lubricant inlet tube 35.

The lubricated rod 29 passes through the restricted passage 31 at the exit end of the elongated chamber 28. The rod 29 is momentarily reduced in diameter on passing through the restricted passage, but because of the lubrication feature and the smooth taper of the passage 32 this is accomplished without introducing disrupting strains or turbulence, and the rod 29 recovers elastically as shown at 41 after emerging from the exit passage to substantially the size and shape imparted to it within the tube 25.

We have found that there is a certain essential relation between the diameter of the die passage 17 and the diameter of the confining passage 28 which results in substantial reduction in the radial swelling and axial shrinkage of the extruded rod 29 as compared to the swelling and shrinkage which would occur, if the two passageways were not proportioned according to such essential relationship. The essential relationship necessary to obtain the desired result requires that the confining passage 28 be so constructed that its diameter is greater than the diameter to which the stock 13 would normally swell upon emerging into free space from the die passage 17. By also providing the snubber 30 at the end of the passage 28, the stock is caused to fill the passage 28, and the stock is thereby in effect made to swell radially more than a normal amount. It has been found that the steps of causing the stock to swell more than a normal amount in the passage 28 and maintaining the stock in such enlarged size for a brief period of time, largely eliminates the subsequent radial swelling and axial shrinkage after the extruded product has been finally released from confinement and has swollen to its stable size immediately after being discharged from the snubber 30.

The unique result obtained when the elongated confining passageway is constructed according to the foregoing essential relationship may be explained by first considering the source of the shrinkage which occurs when a plastic is extruded from a conventional die. In the usual extrusion operation, the molecules of rubber, or similar elastoplastic, become oriented longitudinally to a considerable extent along the axis of extrusion upon passing from the relatively large diameter extrusion chamber into the restricted die passageway and this orientation is responsible for subsequent radial swelling and axial shrinkage of conventionally extruded plastic products. In the present invention, the stock, after becoming axially oriented by passing through the restricted die passage, such as passage 17, is made to swell to a larger diameter than that to which the stock would ordinarily swell upon emerging from the passage 17, and it is thereby reoriented or strained radially of the extrusion axis. This radial reorientation largely nullifies the effect of the axial orientation imparted in the restricted passage 17, so that the finally released extruded product undergoes little if any swelling or shrinkage.

The improvement in shrinkage obtainable by our invention, as well as the essential dimensional relationships of the various passageways, are illustrated by the following table of data, which show the shrinkage obtained by extruding a relatively soft vulcanizable rubber golf ball stock through a lubricated confining tube four feet long, at a rate of 25 feet per minute, while employing die passages 17 and restricting passages 31 of various diameters, the passage 28 remaining constant. The shrinkage values recorded in the table signify the decrease in the length of a freshly extruded piece of the stock after standing 24 hours.

| Diameter of Die Passage 17 | Diameter of Confining Passage 28 | Diameter of Snubbing Passage 31 | Shrinkage |
|---|---|---|---|
| Inches | Inches | Inches | Percent |
| (a) .710 | .710 | .675 | 25 |
| (b) .516 | .710 | .700 | 12.5 |
| (c) .312 | .710 | .500 | 4 |

In (a), with no reduction in the diameter of the die passage, the shrinkage is very high. In (b), with about a 50% reduction in the cross-section of the die passage 17, the shrinkage is reduced by one-half, but still is undesirably high. In (c), which embodies our invention, the cross-section of the die passage 17 is about one-fifth that of the passage 28, and the shrinkage is reduced to a negligible value. In order to insure that the rubber entirely fills passage 28 in (c) after passing through such a small die, the cross-section of the snubbing passage 31 is reduced to about one-half of that of the confining passage 28.

It has been found that with the usual vulcanizable rubber stocks, the cross-sectional area of the confining passage 28 should be three to six times, preferably about four to five times, that of the die passage 17, while the cross-sectional area of the snubbing exit passage should be from 50% to 95%, preferably about 75%, of that of passage 28. The snubbing exit passage should not be too small, otherwise the stock may be permanently deformed or disrupted in passing therethrough.

The passage 28 must be long enough to confine the material in the expanded size for a time sufficient to effect substantial radial reorientation in order to obtain the desired result. The greater the rate of extrusion, the longer this passage must be in order to confine the stock in the desired shape long enough to effect the desired stabilization. In general, the length of the passage 28 should be such that the product is confined in the desired shape for at least 3 seconds, and preferably 15 to 20 seconds. Since longer times of confinement, e. g. 50 or 100 seconds, or even more, may be employed without ill effect, there is no upper limit on the length of the confining passageway, except that imposed by space and friction of the plastic on the walls of the passageway. However, it is observed that no appreciable further advantage results from confining the material for a time in excess of about 20 seconds, and therefore the length of the passage 28 need not be greater than necessary to confine the material for such time at the desired rate of extrusion.

The lubrication feature is essential to the desired stabilization result, since without such lubrication it would be impossible to move the plastic stock through the long passage 28 without introducing disrupting strains due to the enormous friction of the outer layers of stock against the surface of the passage. The small amount of lubricant which remains on the surface of the rod 29 as it passes through the restriction 31 permits the rod to slide easily therethrough without permanent deformation.

Suitable lubricants for this process include any liquid substances which are not deleterious to the plastic being extruded and which have anti-sticking properties. Glycerin, soap solutions, silicone mold release fluid (which latter is a liquid mixture of low molecular weight, linear polymeric organo-siloxanes), and the like are satisfactory lubricants for the usual rubber stocks and plastics.

Referring to Fig. 2, the improvement in uniformity of size realized by the method of the present invention is readily apparent. The points on the graphs shown therein represent, on the vertical scale, the relative weights of equal lengths serially sampled from a cylindrical extruded product 29, expressed in terms of the percent variation of the weight of each piece from the average weight of all the pieces. The upper graph "A" represents such variation obtained when the product is extruded at a rate of approximately 20 feet per minute from a conventional, unlubricated, short die having a delivery passage ⅜ inch long and a diameter of ½ inch. The lower graph "B" shows the result obtained with the apparatus of this invention as shown in Fig. 1, having an entrance die $\tfrac{5}{16}$ inch inside diameter, a continuously lubricated confining tube 20 feet long and ⅝ inch inside diameter, and an exit snubber ½ inch inside diameter. The rate of extrusion in the latter case was approximately 20 feet per minute.

Comparison of graph "A" with graph "B" shows that the extruded product obtained by the method of the present invention was far more uniform than that obtained with a conventional die. The relative uniformity obtained by the two methods may be expressed quantitatively as the coefficient of deviation, that is, the ratio of standard deviation to average weight, times 100. In graph "A" the coefficient of deviation was 5.38, while in graph "B" it was only 1.94.

In general, it has been found that with the method of this invention a coefficient of deviation having a value in the range from 1% to 2% is readily obtainable, whereas for the products of conventional extrusion apparatus it is from 3% to 6%. The significance of the low coefficient of deviation obtained by our invention is that the spread between the high and low weight values obtained in a series of extruded forms is correspondingly reduced. This means that the number of rejects or defective articles produced by reason of the extruded forms being undersize or oversize is materially reduced, and the amount of flash occurring when such forms are molded is also materially reduced. The closer control over the weight of the extruded form made possible by the present method makes it possible to realize further savings in the factory by permitting reduction in the average weight specifications of the extruded forms. In conventional extrusion operations, such average weight specifications must be set undesirably broad to allow for the relatively large unavoidable variations inherent in the ordinary extrusion process.

Having thus described our invention what we claim and desire to protect by Letters Patent is:

1. A method of shaping plastic materials having elastic memory in the form of an elongated article of definite desired cross-sectional shape and area, comprising in combination the successive steps of advancing the material under pressure through a constricted orifice having a cross-sectional area less than the cross-sectional area of the desired article, forcing the material to swell to a size greater than the size to which it would swell if it were extruded into the open from such orifice, said greater size being substantially equal in cross-sectional shape and area to the said definite cross-sectional shape and area of the desired article, confining the material in said greater size until it has substantially lost its tendency to change size, and releasing the material, whereby it freely retains substantially the said definite cross-sectional shape and area of the desired article.

2. A method of extruding plastic materials having elastic memory in the form of an elongated article of definite desired cross-sectional shape and area, comprising in combination the successive steps of advancing the material under pressure through a constricted orifice having a cross-sectional area less than the cross-sectional area of the desired article, forcing the material to swell to a size greater than the size to which it would swell if it were extruded into the open from such orifice, said greater size being substantially equal to the said definite cross-sectional shape and area of the desired article, confining the material in said greater size for a period of at least three seconds while advancing the material through a lubricated passageway having such size, and subsequently releasing the material, whereby it freely retains substantially the said definite cross-sectional shape and area of the desired article.

3. A method of extruding raw vulcanizable rubber stocks in the form of an elongated article of definite desired cross-sectional shape and area, comprising in combination the successive steps of advancing the stock under pressure through a constricted orifice having a cross-sectional area less than the cross-sectional area of the desired article, forcing the stock to swell to a greater size having a cross-sectional area three to six times the area of said orifice, said swollen size being substantially equal in cross-sectional shape and area to the said definite cross-sectional shape and area of the desired article, confining the stock in such swollen size for at least three seconds within a passageway while advancing and lubricating the stock, and subsequently releasing the stock from such confinement, whereby it freely retains substantially the said definite cross-sectional shape and area of the desired article.

4. Extrusion apparatus including a die having a restricted passage therethrough, an elongated tube attached to said die for fixing the ultimate size and shape of the extruded article and having a passage therein, of cross-sectional area 3 to 6 times greater than the area of said die passage, the exit end of said die being connected to the entrance of said tube by a smoothly curved continuous surface to provide a smooth continuous axially aligned passageway for streamlined flow out of said die and into said tube, a restricted passageway at the exit end of said tube, and means for lubricating said tube the said restricted exit passageway having a cross-sectional area of from 50% to 95% of the cross-sectional area of the said passage in said tube the said passageway at the exit end of the tube being insufficiently constricted to cause permanent deformation of elastic stock extruded therethrough.

5. Apparatus for shaping raw rubber stock comprising an elongated tube having essentially the cross-sectional size and shape of the desired article, a constricting die at the entrance end of said tube, said constricting die having a cross-sectional area equal to approximately 25% of the cross-sectional area of said tube, the exit end of said die being connected to the entrance of said tube by a smoothly curved continuous surface to provide a smooth continuous axially aligned passageway for streamlined flow out of said die and into said tube, means for advancing rubber stock under pressure through said die, means for applying a thin film of lubricant to the surface of the rubber as it passes into said elongated tube, and means for causing the rubber emerging from said die to swell radially to fill the elongated tube said swell-causing means being a constricted exit member attached to the exit end of said tube and having a cross-sectional area of about 75% of the cross-sectional area of the tube.

6. Extrusion apparatus for shaping raw elastoplastic forms comprising an elongated tube having essentially the cross-sectional size and shape of the desired form, a restricting die at the entrance end of said tube the exit end of said die being connected to the entrance of said tube by a smoothly curved continuous surface to provide a smooth continuous axially aligned passageway for streamlined flow out of said die and into said tube, said tube having a cross-sectional area 3 to 6 times the area of said entrance die, a snubbing die at the exit end of said tube having a cross-sectional area equal to from 50 to 95% of that of said tube, and means for applying a thin film of lubricant to the surface of the elastoplastic as it passes into said tube.

References Cited in the file of this patent

UNITED STATES PATENTS

| Number | Name | Date |
|---|---|---|
| 1,560,368 | Bartels et al. | Nov. 3, 1925 |
| 2,405,039 | Jesionowski | July 30, 1946 |
| 2,443,289 | Bailey | June 15, 1948 |
| 2,512,844 | Weber | June 27, 1950 |